M. J. BARRON.
Stop-Knot for Check-Rower.

No. 219,434.　　　　　Patented Sept. 9, 1879.

Witnesses:　　　　　　　　　　Inventor
　　　　　　　　　　　　　　　M. J. Barron,
　　　　　　　　　　　per

UNITED STATES PATENT OFFICE.

MOSES J. BARRON, OF DAWSON, ILLINOIS.

IMPROVEMENT IN STOP-KNOTS FOR CHECK-ROWERS.

Specification forming part of Letters Patent No. 219,434, dated September 9, 1879; application filed May 8, 1879.

*To all whom it may concern:*

Be it known that I, MOSES J. BARRON, of Dawson, in the county of Sangamon and State of Illinois, have invented certain new and useful Improvements in Stop-Knots for Check-Rowers; and I do hereby declare that the following is a full, clear, and exact description thereof, reference being had to the accompanying drawings, and to the letters of reference marked thereon, which form part of this specification, in which—

Figure 1:
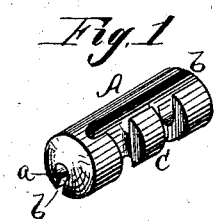
Figure 2:
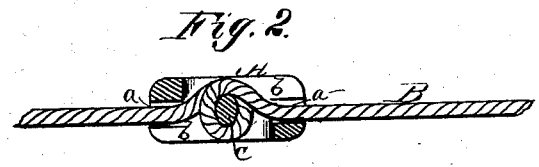

Figure 1 is a perspective view of my improved stop-knot; and Fig. 2 is a longitudinal section thereof.

The object of my invention is to provide a cheap and easily-attached stop-knot for check-row cords; and it consists in a small piece of malleable metal having a central opening in each end, with a slot through the side, and a central post, around which the cord is wound, as will be more fully set forth.

In order to enable others skilled in the art to which my invention appertains to make and use the same, I will now proceed to describe its construction.

A represents the stem of the knot, which is at the ends cylindrical in form, and provided with a small hole, $a$, passing lengthwise through each end. These holes $a$ $a$ are connected with the outer surface of the cylinders, upon opposite sides of the knot, by longitudinal slots $b$ $b$, which may be of any suitable form, but preferably wedge-shaped, or flaring outwardly, to facilitate the entrance of the cord.

One side of the stem A is cut away between the cylindrical ends, leaving in the center a projecting headed post, $c$, the neck of which is grooved to admit of the cord being passed round it without projecting beyond the outer surface of the knot.

The spaces between the post $c$ and the ends of the knot are made just large enough for the passage of the cord.

In attaching the stop-knot, the check-row cord B is passed into one of the holes $a$, through the slot $b$, and then wound once round the post $c$, passing out through the other hole $a$, as seen in Fig. 2. The ends of the knot are then hammered down, closing the slots $b$ $b$ and firmly securing the stop-knot in place upon the cord.

Having thus fully described my invention, what I claim, and desire to secure by Letters Patent, is—

The within-described stop-knot for check-row cords, consisting of the metallic stem or body A, having holes $a$ $a$, slots $b$ $b$, and central post, $c$, substantially as and for the purposes set forth.

In testimony that I claim the foregoing as my own I affix my signature in presence of two witnesses.

MOSES J. BARRON.

Witnesses:
CLINTON L. CONKLING,
THOMAS CORRELL.